United States Patent [19]

Brown

[11] 4,156,348

[45] May 29, 1979

[54] TWO STAGE OPERATIONAL MASTER CYLINDER

[75] Inventor: George E. Brown, Niles, Mich.

[73] Assignee: The Bendix Corporation, Southfield, Mich.

[21] Appl. No.: 810,138

[22] Filed: Jun. 27, 1977

[51] Int. Cl.² .......................... B60T 11/08; F15B 7/04
[52] U.S. Cl. .......................... 60/578; 60/589; 251/324
[58] Field of Search ................ 60/562, 574, 575, 578, 60/581, 588, 589; 251/324

[56] References Cited

U.S. PATENT DOCUMENTS

| | | | |
|---|---|---|---|
| 2,291,056 | 7/1942 | Pallady | 60/578 |
| 3,358,964 | 12/1967 | Cohen | 251/324 |
| 4,066,239 | 1/1978 | Hall | 251/324 |
| 4,072,011 | 2/1978 | Ewald | 60/562 |
| 4,086,770 | 5/1978 | Shaw | 60/562 |

FOREIGN PATENT DOCUMENTS 34-15514 9/1959 Japan.

*Primary Examiner*—Martin P. Schwadron
*Assistant Examiner*—Abraham Hershkovitz
*Attorney, Agent, or Firm*—Leo H. McCormick, Jr.; Ken C. Decker

[57] ABSTRACT

A control member responsive to a predetermined operational pressure signal for transferring that portion of an input force acting on a first diameter of a pressurizing piston in a two stage servomotor to a second diameter. The input force acts on the pressurizing piston and moves the second diameter section thereof in an outlet chamber to further pressurize the fluid therein and meet an operational demand associated with the input force.

2 Claims, 3 Drawing Figures

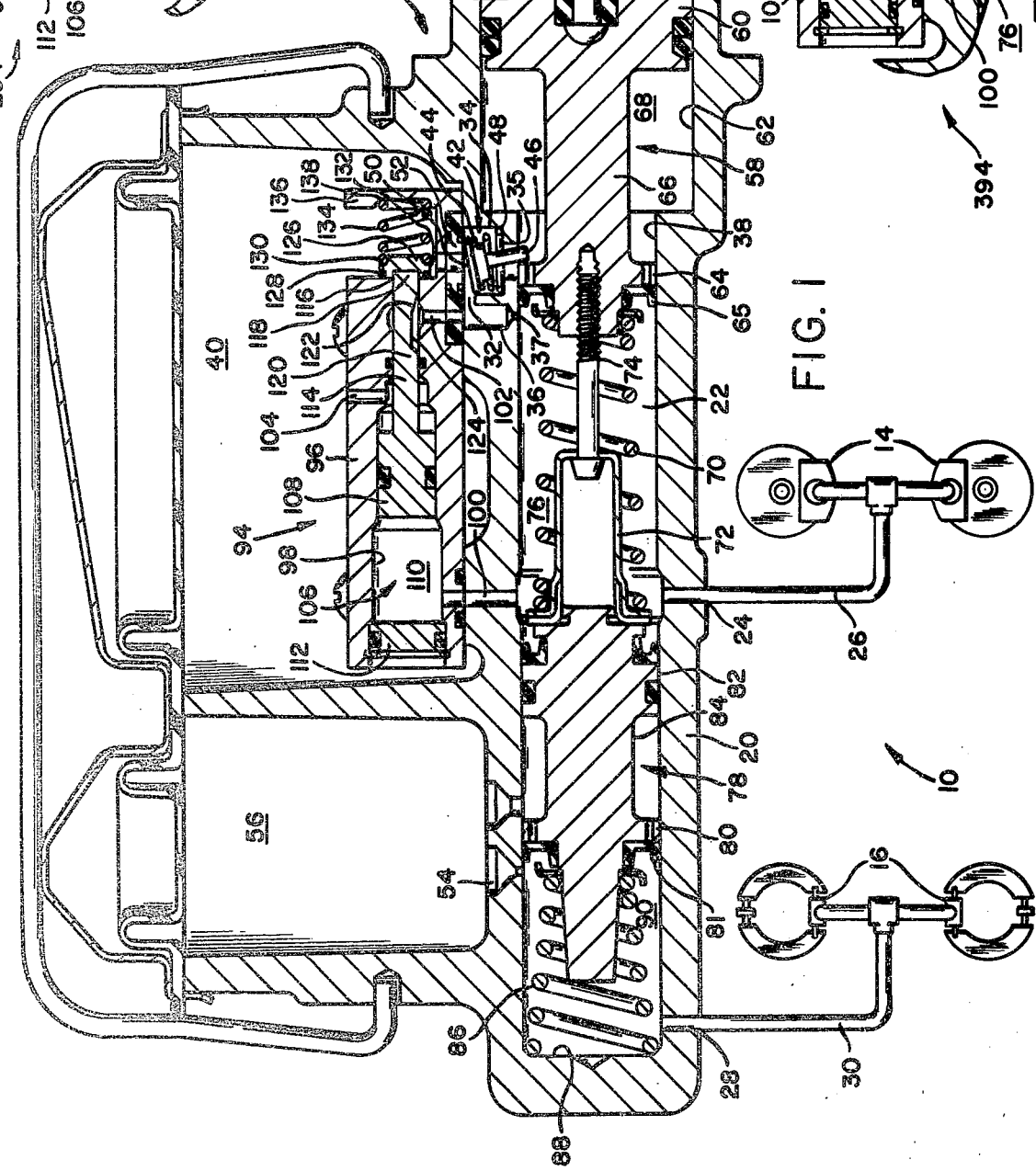
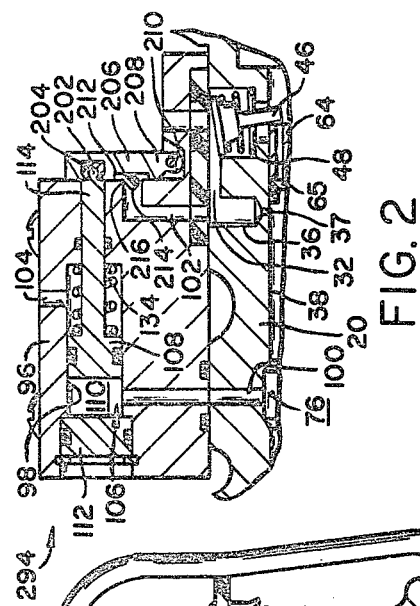
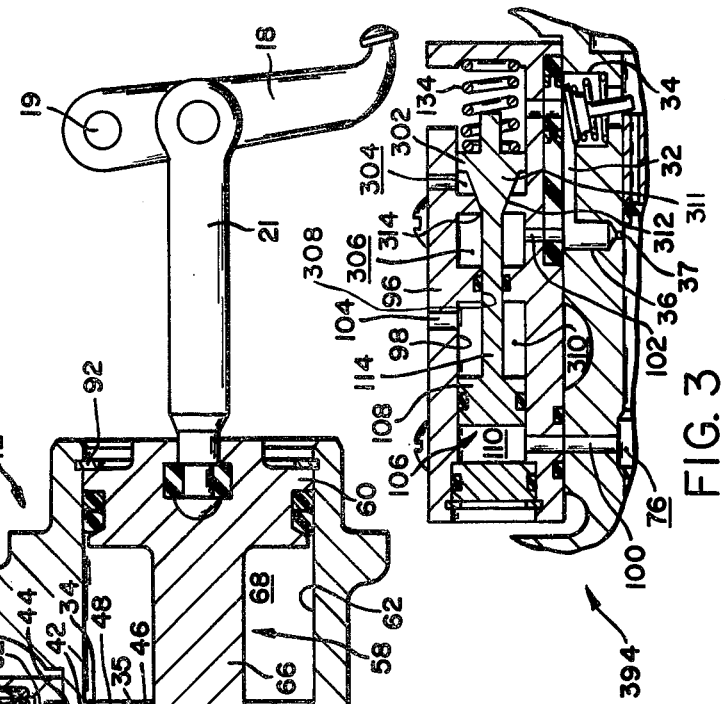

4,156,348

TWO STAGE OPERATIONAL MASTER CYLINDER

BACKGROUND OF THE INVENTION

This invention relates to a two stage master cylinder having a two diameter piston or two concentric pistons whose initial movement supplies a brake system with a large volume of hydraulic fluid at a relatively low pressure for bringing the brake shoes or pads into contact with brake drum or rotors and upon subsequent movement with a relatively small volume of hydraulic fluid at a high pressure for actually effecting a brake application.

An early example of a two stage master cylinder is found in U.S. Pat. No. 1,892,335 wherein lost motion associated with mechanical linkages is essentially overcome through the use of a two step braking process. In this braking operation a high volume of hydraulic fluid moves the brake shoes into contact with the brake drums and thereafter permits a smaller amount of fluid at a high pressure to effect a brake application.

In an effort to improve the transitional operation of two stage servomotors, various valving arrangements such as disclosed in U.S. Pat. Nos. 3,631,676 (Krusemark) and 3,802,199 (Hagberg Jr.), allow an operational input force to be applied to a smaller diameter piston area when a transition pressure is created in the system. Unfortunately, the transition pressure still acts on a larger diameter during the remaining brake pressure range.

U.S. Pat. No. 3,667,229 (Cresto), illustrates a valve which eliminates the input force acting on the large diameter above the transition pressure. Unfortunately, this transition pressure occurs during high pressure fluid production. When the transition occurs, the brake pedal moves through an increased rate of angular travel giving a driver the impression of brake fade or failure.

SUMMARY OF THE INVENTION

I have devised a control member for a two stage master cylinder which is responsive to a predetermined operational pressure signal for providing a smooth and controlled transfer of that portion of an input force acting on a large diameter of the pressurizing piston to a smaller diameter.

The control member has a housing with a cavity therein. A bearing wall divides the cavity into a control chamber and a relief chamber. The control chamber is connected by a control passage to the outlet chamber of the two stage master cylinder associated with the smaller diameter of the piston. The relief chamber is connected by a relief passage to the pressurizing chamber associated with the larger diameter of the piston and by an orifice to a reservoir in the two stage master cylinder. A plunger located in the control chamber has a stem which extends through the bearing wall, the relief chamber and an orifice communicating with the reservoir. The stem has a groove located between a first and second land. The first land which is adapted to substantially fill the orifice has a ramp extending to a groove adjacent the second land. A spring connected to the stem urges the first land toward the relief chamber to prevent fluid communication from the pressurizing chamber to the reservoir through the relief passage. An input force applied to the piston initially pressurizes fluid in the pressurizing chamber and the outlet chamber to develop an operational fluid signal.

The operational fluid signal is simultaneously communicated to the wheel brakes and to the control chamber. When the operational fluid signal reaches a predetermined value, the plunger moves in opposition to the spring and allows fluid communication between the pressurizing chamber and the relief chamber through the orifice. The ramp and the housing surrounding the orifice cooperate to provide a variable flow path for the fluid communicated from the relief chamber. This variable flow path allows the operational fluid signal in the pressurizing chamber to be proportionally reduced as the input force is transferred to the smaller diameter of the piston to pressurize the fluid in the outlet chamber and meet the braking demand corresponding to the input force.

It is the object of this invention to provide a two stage master cylinder with a control member for proportionally transferring that portion of an input force acting on a large diameter of a piston to a smaller diameter in response to a predetermined operational fluid signal.

It is a further object of this invention to provide a control member with a valve that varies the flow path between a relief chamber and a reservoir as a function of the increase in an operational fluid signal above a predetermined value.

These and other objects should be apparent from reading this specification in conjunction with the drawings.

BRIEF DESCRIPTION OF THE DRAWINGS

FIG. 1 is a schematic illustration of a brake system having a sectional view of a two stage master cylinder constructed according to the principles of this invention;

FIG. 2 is a sectional view of a second control member for use in the two stage master cylinder of FIG. 1; and FIG. 3 is a sectional view of a third control member for use in the two stage master cylinder of FIG. 1.

DETAILED DESCRIPTION OF THE INVENTION

The brake system 10 shown in FIG. 1 includes a two stage master cylinder 12 which is connected to the front wheel brakes 14 and to the rear wheel brakes 16 of a vehicle. The two stage master cylinder 12 responds to an operator input applied to pedal 18 for supplying the front and rear wheels 14 and 16 with an operation fluid signal to effect a brake application.

In more particular detail, the two stage master cylinder 12 has a housing 20 with a stepped bore 22 therein. The stepped bore 22 has a first outlet port 24 connected to the front wheel brakes 14 by conduit 26 and a second outlet port 28 connected to the rear wheel brakes 16 by conduit 30.

A first compensator passage 32 has a first branch 34 and a second branch 36 connected to diameter 38 of bore 22 for communicating fluid from reservoir 40 into the front wheel brake system.

A tilt valve 42 located in the compensator passage 32 has a disc 44 with a stem 46 which extends into bore 22. A spring 48 located in passage 32 urges the face 50 on disc 44 toward a seat 52 to inhibit communication of fluid between the reservoir 40 and the compensator passage 32.

A second compensator passage 54 connects reservoir 56 to diameter 38 of bore 22 for communicating fluid into the rear wheel brake system.

A first piston 58 has a first diameter section 60 located in large diameter 62 of bore 22 and a second diameter section 64 located in the smaller diameter 38 of bore 22. A cylindrical member 66 separates the first diameter section 60 from the second diameter section 64 and in conjunction with housing 20 establishes a quick fill or pressurizing chamber 68 in the master cylinder 12.

A caged spring 70 has a retainer 72 connected to piston 58 by an adjustable bolt 74 for establishing the size of an outlet chamber 76 in bore 22 adjacent outlet port 24.

A second piston 78 located in bore 22 has a cylindrical body with a first land 80 separated from a second land 82 by a groove 84. A return spring 86 located between the bottom 88 of bore 22 urges the second land 82 of the second piston 78 against retainer 72 to establish a second outlet chamber 90 adjacent outlet port 28. The return spring 86 also holds the first diameter 60 of piston 58 against stop 92 to permit reservoir communication through the compensator passage 32 when the second diameter 64 engages stem 46 on tilt valve 42.

A control member 94 located in reservoir 40 is adapted to regulate the transfer of the operation of piston 58 from the larger diameter 60 to the small diameter 64 in response to the level of the fluid pressure communicated through outlet port 24 to the front wheel brakes 14.

The control member 94 has a housing 96 with a stepped bore 98 extending therethrough. The stepped bore 98 is connected to the outlet chamber 76 by a control passage 100, to compensator passage 32 by a relief passage 102, and to reservoir 40 by passage 104.

A plunger member 106 which is located in the stepped bore 98 has a head section 108 positioned between control passage 100 and reservoir passage 104. The plunger 106 and plug 112 establish the size of the control chamber 110 in bore 98 and is designed to prevent any noticeable loss of fluid from the system when plunger 106 moves in response to the outlet fluid pressure in chamber 76.

A stem 114 which is connected to the head section 108 of the plunger extends through bore 98, past orifice 116 and into reservoir 40. The stem 114 has a first land 118 separated from a second land 120 by a ramp section 122 which blends into a groove or relief chamber 124 adjacent the second land 120. The first land 118 substantially fills orifice 116 and prevents fluid communication from groove 124 to the reservoir 40.

However, in some applications a cap member 126 which is attached to the first land 118 of the stem 114 has a first groove 130 on one side for retaining a seal 128 to assure that fluid flow through orifice 116 is prevented when land 118 is located in orifice 116. In addition, cap member 126 has a second groove 132 for providing spring 134 with a first guide surface. The second groove 132 is aligned with depressed area 138 in retainer arm 136 for providing spring 134 with a second guide surface.

MODE OF OPERATION OF THE INVENTION

When a vehicle operator desires to effect a brake application, an input force is applied to pedal 18. Pedal 18 responds to the input force by rotating around pin 19 to impart a linear force to push rod 21 which is connected to the first piston 58.

Initial movement of the first piston 58 moves seal 65 on the second diameter section 64 past communication port 37 in the second branch 36 of the compensator passage 32 to prevent the flow of fluid from the outlet chamber 76 to the reservoir 40. At the same time, spring 48 urges face 50 against seat 52 to also seal the compensator passage 32 and the quick fill chamber 68 from the reservoir 40.

Initial movement of the first piston 58 is transferred through spring 70 to move seal 81 on the second piston 78 adjacent land 80 past compensator port 54 and thereby interrupt communication between pressurizing chamber 90 and reservoir 56.

As piston 58 moves in response to the input force, a volume of fluid from chamber 68 flows past seal 65 and into the outlet chamber 76 to create an initial operational braking signal. The initial operational braking signal is simultaneously transmitted through the outlet port 24 for distribution to the front wheel brakes 14 and to the control chamber 110 through passage 100.

The initial operational braking signal in the control chamber 110 acts on the face of plunger 108. When the initial operational braking signal reaches a predetermined value, which may be selected to coincide with the engagement of the disc pads with the rotors in the front wheel brakes 14, spring 134 is overcome and plunger 108 moves land 118 on stem 114 past orifice 116 to provide a variable flow path for fluid between the housing 96 and ramp 122, and allow the fluid pressure in pressurizing chamber 68 to be reduced as fluid flows into reservoir 40 through relief passage 102. As fluid flows from the pressure chamber 68, that portion of the input force acting on the large diameter 60 of piston 58 is transferred into the smaller diameter 64.

As the pressure of the fluid in chamber 76 increases above the predetermined value, plunger 108 moves in a corresponding manner such that eventually groove 124 on stem 114 is located adjacent orifice 116 and unrestricted communication exists between pressurizing chamber 68 and reservoir 40. Thereafter, the entire input force from the operator is applied to the smaller diameter 64 of piston 58 to further pressurize the fluid in the outlet chamber 76 and supply the front wheel brakes 14 with an actuation signal corresponding to the entire input force applied to pedal 18 by the operator.

Upon termination of the input force to pedal 18, return spring 86 and spring 70 move the first and second pistons 58 and 78 toward the rest position illustrated in FIG. 1. As the large diameter section 60 of piston 58 moves toward stop 92, fluid from the reservoir 40 is drawn into pressurizing chamber 68 by flowing through orifice 116, past ramp 122 and groove 124, into relief passage 102 and compensator passage 32 before exiting through either port 35 in the first branch 34 or port 37 in branch 36. In addition, because of the large volume required to fill pressurizing chamber 68, a pressure differential occurs across face 50 on poppet 42 to allow fluid to flow around seat 52 and directly into the first branch 34 of the compensator passage 32.

As the pressure signal in the control chamber 110 is reduced, spring 138 acts on stem 114 to move plunger 108 toward the control chamber 110. When the pressure signal in the control chamber drops below the predetermined value, land 118 on stem 114 closes off orifice 116 to terminate communication through orifice 116 into the reservoir 40.

As piston 58 engages stop 92, the second diameter section 64 engages stem 46 to move face 50 away from seat to allow unlimited communication between the reservoir 40 and compensator passage 32.

In the embodiments shown in FIGS. 2 and 3, elements identical to those used in control 94 in FIG. 1 are identified by the same reference number.

In FIG. 2, the stem 114 of the plunger 106 has a ball 202 which fits into a socket 204 in lever 206. The lever 206 has a first end 208 fixed to pin 210. A poppet 212 which is attached to the lever 206 has a spherical surface 214 which is aligned in orifice 216 to control the flow of fluid from the relief passage 102.

In operation the control member 294 in FIG. 2 functions in the same manner as control member 94 in FIG. 1. Namely, fluid pressure from the outlet chamber 76 is simultaneously communicated through control passage 100 into control chamber 110 and the outlet port 24 to the front wheel brakes 14. The fluid pressure acts on the face of plunger 108 and at a predetermined level overcomes spring 134 to allow stem 114 to move in housing 96. Movement of stem 114 which is transmitted to lever 206 through the ball 202 and socket 204 causes the lever 206 to pivot about pin 210. As lever 206 pivots about pin 208, the spherical surface 214 on the poppet 212 is moved out of the relief passage 102 to establish a variable area flow path for the communication of fluid from pressurizing chamber 68 to reservoir 40.

When the input force on the push rod 21 terminates, the fluid pressure signal in the control chamber 110 maintains the poppet 212 in the open condition until the predetermined fluid pressure signal level is achieved. Thereafter, spring 134 moves the plunger 108 and associated lever 206 to seat poppet 212 in orifice 216 to interrupt the communication of fluid through the relief passage 102.

However, fluid from the reservoir 40 is also drawn into chamber 68, through the rearward movement of piston 58, by flowing between seat 52 and face 50 on poppet 42 when spring 48 is overcome by a negative pressure developed in chamber 68. Upon engagement of stem 46 by the second diameter surface 64 on piston 58, compensator passage 32 is completely opened. Thus, the fluid in chamber 68 is replenished and a subsequent brake application for the two stage servomotor can be effected without any loss of fluid to the front wheel brake system.

In the control member 394 shown in FIG. 3, plunger member 106 is balanced within bore 98. The head member 108 in the control chamber 110 is balanced by the valve body 302 in the outlet chamber 304 of the relief chamber 306. A bearing wall 308 which separates the relief chamber 306 from reservoir chamber 310 aligns the conical face 311 on the valve body 302 with a corresponding seat surface 312 of orifice 314.

In operation, the fluid pressure signal developed in the outlet chamber 76 is transmitted to the control chamber 110 and acts on the face of the head section 108. At the same time, the fluid pressure signal in pressurizing chamber 68 is transmitted to the relief chamber 306 through relief passage 102. The fluid pressure signal is retained in the relief chamber 306 since spring 134 holds the conical surface 311 in a seal position with the orifice surface 312.

When the fluid pressure signal reaches a predetermined value, spring 134 is overcome and the fluid pressure in the relief chamber 306 is allowed to flow into reservoir 40 through orifice 314. The size of the flow path for the fluid through orifice 314 is variable as the area between surface 311 and surface 312 change. This controlled reduction of the fluid pressure signal from chamber 68 corresponds to the transfer of that portion of the input force acting on the large diameter 60 portion of piston 58 to the smaller diameter 64 to allow the fluid in the outlet chamber 76 to be further pressurized and meet an operational pressure signal corresponding to the input force.

I claim:
1. A two stage master cylinder comprising:
a housing having a bore with first and second diameter sections, a compensator passage for connecting said first and second diameter sections to a fluid reservoir, a relief passage for connecting said first diameter section to a relief chamber, an outlet port for connecting said second diameter section of said bore to the wheel brakes of a vehicle, and a control passage for connecting said second diameter section of said bore to a control chamber;
piston means located in said first and second diameter sections of said bore for pressurizing fluid therein to supply said wheel brakes with an operational fluid signal through said outlet port in response to an input force;
compensator valve means responsive to movement of said piston means for interrupting communication of fluid from the reservoir to said bore;
control valve means responsive to a predetermined operational fluid signal for allowing communication of fluid between said first diameter section of said bore and said relief chamber through said relief passage to thereafter permit the input force to be transferred through the piston means to only pressurize the fluid in said second diameter section of the bore in the production of said operational fluid signal, said control valve means including:
a plunger having a head section located in said control chamber;
a cylindrical spool connected to said head section which extends into said relief chamber, said operational fluid signal acting on said head section and moving said spool in said relief chamber to permit fluid to flow from said relief chamber through an orifice between said relief chamber and said reservoir into said reservoir;
said control valve means further including a resilient member connected to said spool for resisting the movement of said head section until said predetermined fluid signal is developed in said second diameter section;
said spool further including retainer means attached to said spool and adapted to engage the housing of the relief chamber surrounding said orifice and seal the same to assure that the portion of the operational fluid signal developed in the first diameter section of the bore is transmitted into the second diameter section until said predetermined fluid signal development is achieved;
said compensator valve means including a face member located in said compensator passage;
a stem attached to said face member and extending into said second diameter section of said bore, said stem engaging said piston member to allow fluid communication from the reservoir to the compensator passage in the absence of the transmission of an input force to said piston means; and
a spring located in said compensator passage for urging said face member toward said housing upon movement of said piston means to seal said compensator passage from the reservoir and permit the development of said operational fluid signal in said bore in response to an input force;

said retainer means including a lever having a first end pivotally attached to said housing and a second end connected to said spool, and a poppet attached to said lever and aligned with said relief passage, said lever pivoting about said first end in response to movement of said second end by said spool to position said poppet adjacent said relief passage and restrict the flow of fluid therethrough;

said poppet including a spherical face attached to said poppet and extending into said relief passage to establish a variable flow path for the fluid communicated from the first diameter bore into the reservoir.

2. A two stage master cylinder comprising:

a housing having a bore with first and second diameter sections, a compensator passage for connecting said first and second diameter sections to a fluid reservoir, a relief passage for connecting said first diameter section to a relief chamber, an outlet port for connecting said second diameter section of said bore to the wheel brakes of a vehicle, and a control passage for connecting said second diameter section of said bore to a control chamber;

piston means located in said first and second diameter sections of said bore for pressurizing fluid therein to supply said wheel brakes with an operational fluid signal through said outlet port in response to an input force;

compensator valve means responsive to movement of said piston means for interrupting communication of fluid from the reservoir to said bore;

control valve means responsive to a predetermined operational fluid signal for allowing communication of fluid between said first diameter section of said bore and said relief chamber through said relief passage to thereafter permit the input force to be transferred through the piston means to only pressurize the fluid in said second diameter section of the bore in the production of said operational fluid signal, said control valve means including:

a plunger having a head section located in said control chamber;

a cylindrical spool connected to said head section which extends into said relief chamber, said operational fluid signal acting on said head section and moving said spool in said relief chamber to permit fluid to flow from said relief chamber through an orifice between said relief chamber and said reservoir into said reservoir;

said control valve means further including a resilient member connected to said spool for resisting the movement of said head section until said predetermined fluid signal is developed in said second diameter section;

said spool further including retainer means attached to said spool and adapted to engage the housing of the relief chamber surrounding said orifice and seal the same to assure that the portion of the operational fluid signal developed in the first diameter section of the bore is transmitted into the second diameter section until said predetermined fluid signal development is achieved;

said compensator valve means including a face member located in said compensator passage;

a stem attached to said face member and extending into said second diameter section of said bore, said stem engaging said piston member to allow fluid communication from the reservoir to the compensator passage in the absence of the transmission of an input force to said piston means;

a spring located in said compensator passage for urging said face member toward said housing upon movement of said piston means to seal said compensator passage from the reservoir and permit the development of said operational fluid signal in said bore in response to an input force;

said spool including a first land section separated from a second land by a ramp section that extends from the first land to a groove adjacent said second land, said ramp and said orifice creating a variable flow path for communication of fluid from the first diameter of the bore to said reservoir to provide a substantially uniform transition of the portion of the input force acting on the piston means to the portion of piston means pressurizing the fluid in said bore.

* * * * *